United States Patent Office 3,475,183
Patented Oct. 28, 1969

3,475,183
PROCESS OF MAKING SEASONING LIQUID
Yoko Kimura, 10 Mikawadai Azabu, Minato-ku,
Tokyo, Japan
No Drawing. Filed Jan. 13, 1966, Ser. No. 520,366
Int. Cl. A23l 1/22
U.S. Cl. 99—145                                3 Claims

ABSTRACT OF THE DISCLOSURE

Preparing a seasoning liquid by inoculating a portion of cooked rice with the sojae species of Aspergillus fungus, allowing said portion to ferment until the fungus is evenly spread throughout, mixing additional cooked rice and salt water, fermenting the mixture, mixing unrefined soy into the fermented rice, fermenting the resultant mixture and separating the liquid from the mixture as a seasoning product.

---

This invention relates generally to food seasonings and more particulraly to a liquid seasoning for meats and method of preparation thereof.

Liquid seasonings for use with grilled, broiled or boiled meats heretofore used have been prepared by mixing several types of expensive seasoning liquids or partially brewed ingredients and have therefore, because of the expensive components, resulted in a quite expensive product.

This invention relates to a novel seasoning liquid and method of preparation which is simply produced and which utilizes inexpensive materials to obtain a highly desirable and inexpensive product.

It is, therefore, an object of this invention to furnish an inexpensive liquid seasoning product by providing such a product made up of inexpensive basic ingredients.

It is another object of this invention to furnish an inexpensive method of making seasoning for meats by providing a process which involves a minimum of labor and which utilizes inexpensive basic ingredients.

It is a further object of this invention to furnish a process of making liquid seasoning which is less expensive than prior art products by providing means to reduce the time required in preparing the seasoning.

These and other objects of the invention will be more readily understood by reference to the following detailed description.

The invention involves a process manufacturing acid spices from basic ingredients comprising polished rice, unrefined soy and salt water. A portion of polished rice is inoculated with a fungus and allowed to ferment. Another portion of polished rice is separately steamed and mixed with the inoculated rice and a quantity of salt water and allowed to ferment. Unrefined soy is then mixed with the fermented product and this mixture is permitted to ferment further. After fermentation of the last-mentioned mixture, the product is strained or filtered to extract the resultant liquid seasoning product.

As a specific example of a process in accordance with this invention, a seasoning having a highly desirable taste is prepared as follows:

Approximately 9 parts of polished non-glutinous rice are washed and then soaked from one to two hours in water at room temperature. This first portion of rice is then steamed until cooked and inoculated with a fungus preferably comprising the sojae species of the Aspergillus genus of the Asocomycetes class. The first portion of rice is then allowed to ferment until the fungus is substantially evenly spread throughout the portion.

A second portion of polished non-glutinous rice, comprising 17 parts of the total mixture, is washed and soaked for approximately five hours. This second portion of rice is then steamed until cooked and is then mixed with the first portion along with 18 parts of a 5 percent salt water solution. The resulting mixture is stirred and aerated at a temperature of 25 to 30° C. until well blended and then left to ferment at room temperature for approximately fifteen days.

By utilizing two portions of rice in the manner described above, the time required for suitable fermentation of the entire mass of rice is reduced considerably over the time required if the entire mass of rice were inoculated in that the partially fermented first portion of rice serves to inoculate the remaining portion of rice more effectively than could a direct single inoculation of the entire batch. The additional soaking of the second portion of rice serves to accelerate its inoculation by the first portion.

At the end of fifteen days, the temperature of the fermenting mixture is raised to approximately 30° C. and 56 parts of unrefined soy are added and mixed therein. The last-mentioned rice-soy mixture is then left to ferment for about twenty days at 30° C. whereupon the final fermented mixture is strained or filtered to extract the resultant liquid seasoning product therefrom. The above-referred-to unrefined soy is known in Japanese as "moromi" and comprises liquid taken from the top of a soy sauce mash after fermentation but before filtering or straining.

By chemical analysis, the principal ingredients of the product obtained by the aforegoing process are as follows:

|  | Percent |
|---|---|
| Direct reducing sugar | 25.96 |
| Reducing sugar | 12.13 |
| Nitrogen | 1.02 |
| Salt | 12.90 |
| Water | substantially the remainder |

One of the more essential factors involved in the production of seasoning in accordance with this invention is in the salt content of the salt water solution added at the initial mixing of the two portions of cooked rice. This salt content has an important influence on the acidity, preservation and taste of the final product since, in the event that the salt content of the water is too low, the unrefined soy has a tendency to sour and spoil the fermenting mixture while, if the salt content is too high, the desired final acidity is not obtained. Strict control of the consistency of the salt water is also important in that variations in or non-uniformity of salt content results in varying or unacceptable taste. It is further important that the salt content be fixed in a proper proportion (approximately 5 percent in the example set forth above) in order to produce a final product having moderate acidity, sweetness and the desired flavor. The timing of the addition of the salt water solution is also important to promote the required amount of fermentation in the mixture. It is therefore critical that a salt water solution of the proper salt content be added prior to the addition of the unrefined soy.

When properly produced under the conditions set forth above, a liquid seasoning with a unique flavor and taste and proper viscosity is produced having the sweetness and flavor of unrefined soy harmoniously blended with an acid taste. The acidic content of the product is also effective for tenderizing grilled, broiled or boiled meat in addition to increasing or heightening the flavor thereof. Salt contents in the range of 12 to 13 percent of the final product also serve to preserve the seasoning product over long periods of time.

Among the benefits provided by this invention is production of a very acceptable product at a cost much less than heretofore possible, as well as a simple, inexpensive process requiring a relatively short period of time for production of the product.

What is new and therefore desired to be protected by Letters Patent of the United States is:

1. A process for preparing a seasoning product comprising the steps of:
inoculating polished non-glutinous cooked rice comprising 26 parts of the total mixture with a fungus by inoculating a first portion of said rice comprising approximately 34.6 parts of the total amount of rice with the sojae species of the Aspergillus fungus, allowing the first portion to ferment at room temperature until the fungus is substantially evenly spread throughout, soaking a second portion of uncooked rice comprising the remaining portion of the total amount of rice in water for approximately five hours at room temperature, cooking said second portion and mixing said first and said second portions, adding and mixing in a solution of salt water of 18 parts of the total mixture composed of 5% salt to the rice, fermenting the rice for approximately fifteen days at room temperature, mixing 56 parts of the total mixture of unrefined soy into the fermenting rice, fermenting the resultant mixture for approximately twenty days at 30° C., and separating the liquid from the fermented mixture as a seasoning product.

2. A process in accordance with claim 1 wherein said first and second portions are mixed at a temperature in the range of 25° C. to 30° C.

3. A process in accordance with claim 2 wherein the step of mixing unrefined soy is carried out at a temperature of approximately 30° C.

References Cited

UNITED STATES PATENTS

| 2,967,108 | 1/1961 | Smith et al. | 99—145 XR |
| 3,124,465 | 3/1964 | Watanabe | 99—145 |

FOREIGN PATENTS

| 16,748 | 9/1963 | Japan. |

RAYMOND N. JONES, Primary Examiner

J. R. HOFFMAN, Assistant Examiner.

U.S. Cl. X.R.

99—140